United States Patent [19]

Pullens

[11] 4,027,727
[45] June 7, 1977

[54] PORTABLE BATTERY OPERATED HOT-COLD STORAGE UNIT

[76] Inventor: Gedell Pullens, P.O. Box No. 198, New York, N.Y. 10025

[22] Filed: Feb. 12, 1975

[21] Appl. No.: 549,318

[52] U.S. Cl. .................................. 165/48; 62/236; 165/58; 312/236

[51] Int. Cl.$^2$ ................... F25B 29/00; F25B 27/00; A47B 77/08

[58] Field of Search ................. 165/48, 58; 62/448, 62/449, 236; 312/236, 212

[56] References Cited

UNITED STATES PATENTS

| | | | |
|---|---|---|---|
| 1,881,603 | 10/1932 | Hull .................................... | 165/58 |
| 3,160,452 | 12/1964 | Rothman .......................... | 312/236 |
| 3,199,579 | 8/1965 | Foster et al. ....................... | 165/48 |
| 3,205,033 | 9/1965 | Stentz ............................... | 165/48 X |
| 3,255,812 | 6/1966 | Bayane et al. .................... | 165/48 X |
| 3,291,546 | 12/1966 | Traycoff ......................... | 312/236 |
| 3,481,154 | 12/1969 | Johnson .......................... | 165/48 X |
| 3,885,398 | 5/1975 | Dawkins ........................... | 62/236 X |

Primary Examiner—C. J. Husar
Assistant Examiner—Daniel J. O'Connor

[57] ABSTRACT

A portable battery operated hot-cold food storage unit comprises a rectangular shaped housing having an inner metallic shell with an insulation layer sandwiched between the housing and the shell. A movable front door is hingeably mounted to the housing. A horizontal partition divides the interior chamber into an upper and lower portion, wherein the upper portion has a plurality of insulating horizontal and vertical shelves therein. The shelves which are adjustable and interlocking permit the formation of different size compartments. A cooling coil is contained in a first section of the upper portion, wherein the cooling coil communicates with a cooling assembly contained in the lower portion. An electric motor powered by a household current or a storage battery powers the compressor of the cooling assembly. A heating coil is contained in a second section of the upper portion, wherein the heating coil is thermally heated by a heating element. The heating element is wired to a storage battery or a household current. A plurality of wheel members extend downward from a bottom base of the outer housing.

4 Claims, 5 Drawing Figures

U.S. Patent   June 7, 1977   4,027,727
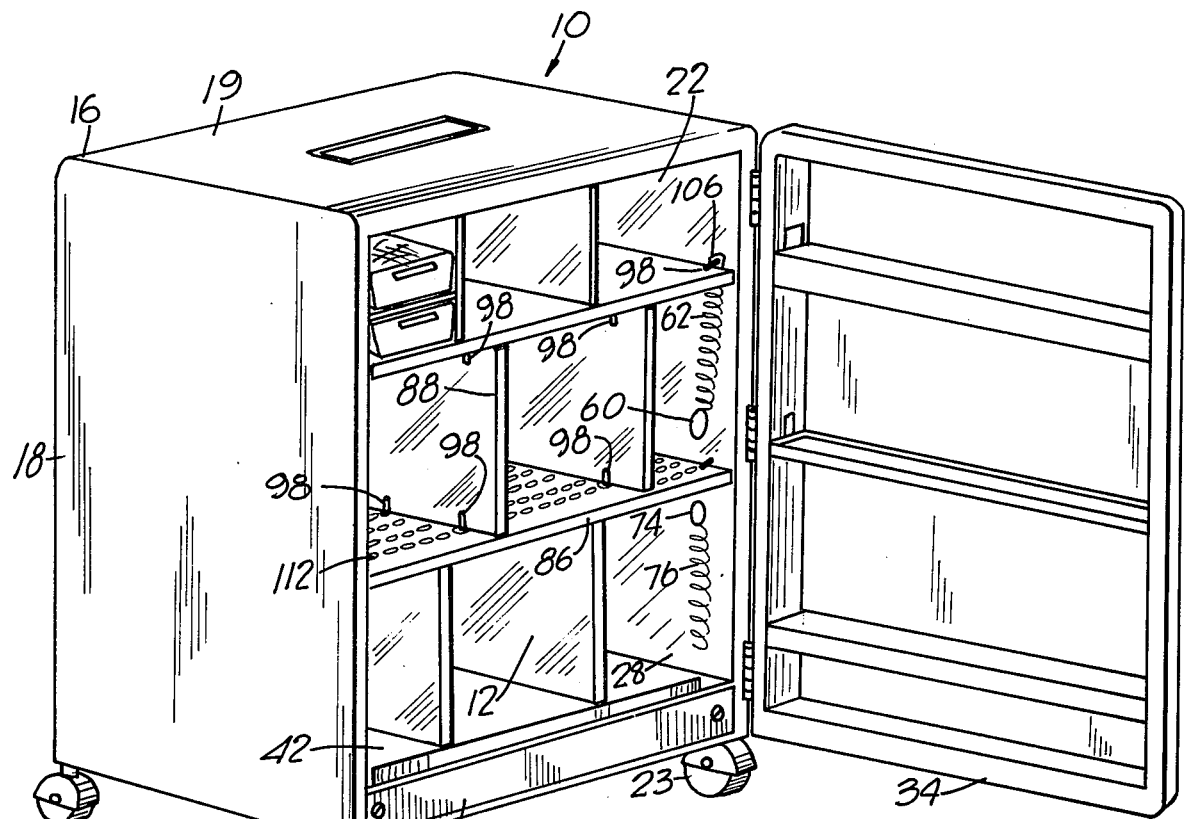
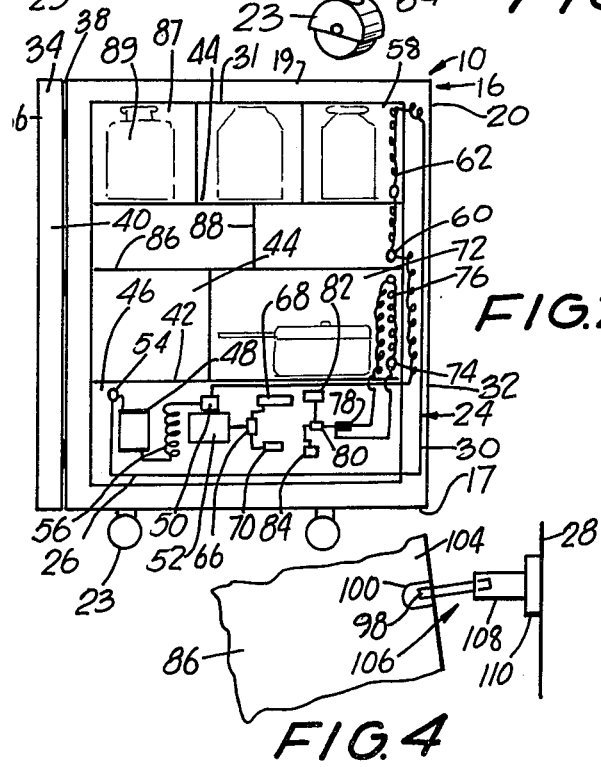
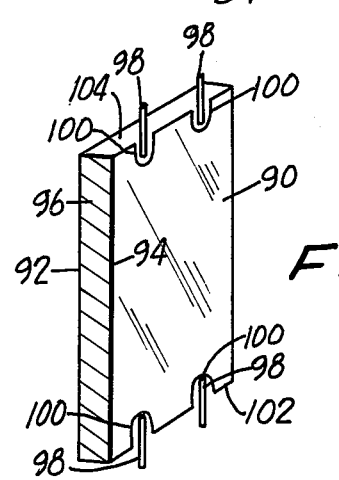
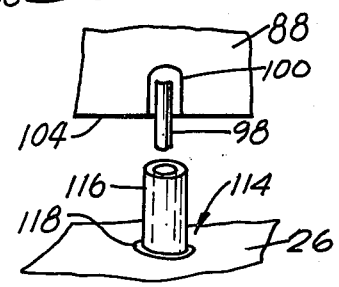

PORTABLE BATTERY OPERATED HOT-COLD STORAGE UNIT

SUMMARY OF THE INVENTION

My invention relates to a unique and novel portable battery operated hot-cold food storage unit capable of storing hot and cold foods simulataneously.

An object of my present invention is to provide a food storage unit capable of simultaneously storing hot and cold foods.

A further object of my present invention is to provide a storage unit capable of being operated by a household current or a battery.

A still further object of my present invention is to provide a means of moving easily the food storage unit.

Another object of my present invention is to provide a plurality of self-interlocking horizontal and vertical shelves capable of forming various size storage compartments for maintaining food articles in a fixed vertical position.

Briefly, my present invention comprises a rectangular shaped housing having an inner metallic sheel with an insulation layer sandwiched between the housing and the shell. A movable front door is hingably mounted to the housing. A horizontal partition divides the interior chamber into an upper and lower portion, wherein the upper portion has a plurality of insulating horizontal and vertical shelves therein. The shelves which are adjustable and interlocking permit the formation of different size compartments. A cooling coil is contained in a first section of the upper portion, wherein the cooling coil communicates with a cooling assembly contained in the lower portion. An electric motor powered by a household current or a storage battery powers the compressor of the cooling assembly. A heating coil is contained in a second section of the upper portion, wherein the heating coil is thermally heated by a heating element. The heating element is wired to a storage battery or a household current. A plurality of wheel members extend downward from a bottom base of the outer housing.

BRIEF DESCRIPTION OF THE DRAWINGS

The objects and features of the invention may be understood with reference to the following detailed description of an illustrative embodiment of the invention, taken together with the accompanying drawings in which:

FIG. 1 illustrates a perspective view of a hot-cold portable food storage unit;

FIG. 2 illustrates a side cross sectional view of the storage unit;

FIG. 3 illustrates a side cross sectional view of a shelf of the storage unit;

FIG. 4 illustrates a perspective view of a mounting bracket for a horizontal shelf; and FIG. 5 illustrates a perspective view of a mounting member for a vertical shelf.

DESCRIPTION OF THE PREFERRED EMBODIMENT

Turning now descriptively to the drawings, in which similar reference characters denote similar elements thoughout the several veiws, FIGS. 1–2 show a portable battery operated cold-hot food storage unit 10 having an interior chamber 12 capable of holding food articles 14 contained therein in a fixed vertical position, which comprises an outer rectangular shaped housing 16 having a bottom base 17, a pair of upward extending sidewalls 18, an upward extending rearwall 20, an upper end 19 and an open front face 22. A plurality of wheel members 23 extend downward from the bottom base 22 of the outer housing 16. An inner rectangular shaped metallic shell 24 is contained within the housing 16, wherein the shell 24 has a bottom base 26, a pair of upward extending sidewalls 28, an upward extending rear wall 30, an upper end 31, and the common open front face 22 to that of the housing 16. An insulation layer 32 is sandwiched between the outer housing 16 and the inner shell 24. A door 34 having an outer layer 36, an inner layer 38, and an insulation layer 40 sandwiched between the outer 36 and the inner 38 layer is hingably mounted to the outer housing 16. A horizontal partition 42 is affixed onto the sidewalls 28 of the inner shell 24 divides the interior chamber 12 into an upper 44 and a lower 46 portion. The cooling assembly consists of a fluid tank 48, a compressor 50, an electric motor 52, an expansion valve 54 and a consensor 56 contained in the lower portion 46. A first section 58 of the upper portion 44 of the interior chamber 12 has a first thermostat 60 and a cooling coil elements 62 therein communicating with the cooling assembly. A removable plate 64 covers the front open face of the lower portion of the interior chamber. A means for powering the electric motor 52 comprises a two way switch 66 wired to the electric motor 52. A storage battery 68 is wired to one terminal of the two way switch 66. A step down transformer 70 adapted to receive a household current is wired to the two way switch 66. A second section 72 of the upper portion 44 of the interior chamber 12 has a second thermostat 74 and heating coils 76 and the heating coils 76 extending down into the lower portion 46 of the interior chamber 12. A means for heating said coils 74 comprises a heating element 78 thermally communicating with the coil 76, wherein the element 78 is wired to a second two way switch 80. A second storage battery 82 is wired to one terminal of the second switch 82. A second step down transformer 84 is adapted to receive the household current is wired to the other terminal of the second switch 80. A plurality of horizontal shelves 86 and vertical shelves 88 are contained in the upper portion 44, wherein the vertical shelves 88 are aligned side to side and front to back.

FIG. 3 shows a vertical 88 or a horizontal 86 shelf consisting of a rectangular shaped panel 90 having two outer layers 92, 94 of thermoplastic. An insulation layer 96 is sandwiched between the outer layers 92, 94. A pair of retractable metallic pin members 98 are mounted in appropriate sleeve bracket 100 mounted on each end 102, 104 of the panel 90 wherein pin members 98 extend linearly outward from the panel 90.

FIG. 4 shows a mounting bracket 106 used for adjustably affixing the horizontal shelves 86 to the inside sidewalls of the inner shell. The bracket 106 consists of an elongated U-shaped flange 108 having a magnetic circular disc 110 affixed onto one end of the flange 108, wherein the pin 98 communicating with the shelf 86 rest into flange 108. The disc 110 adhers by magnetic attraction onto the metallic sidewall 28.

Referring back to FIG. 1, the pin members 98 insert into apertures 112 contained through the horizontal shelf 86, wherein the apertures 112 are aligned in longitudinal rows. The pin members 98 insert into apertures 112 contained in an upper and lower horizontal shelves.

FIG. 5 shows a mounting member 114 used to join a vertical shelf 98 to an upper end 31 for bottom base 26 of the inner shell 24. The member 114 comprises an elongated cylindrical sleeve 116 having a magnetic base member 118 affixed onto one end of the sleeve 116, wherein the base member 118 adheres by magnetic attraction to the upper end 31 or bottom base 26. The pin member 98 inserts into the sleeve 116.

Referring back to FIG. 2, the individual compartments 87 formed by the vertical shelves 86 and horizontal shelves permit placement of various food articles 89 within the compartment 87 and the maintaining of the food article 89 is a vertical alignment by the positioning of the vertical shelves 86. The insulation layer 96 of the shelves 86, 88 permit the separation of the cold 58 and hot 72 sections of the upper portion 44. A flat plate member (not shown) can be laid on the horizontal shelf 86 of the hot section 72 to close up apertures 112.

Hence, obvious changes may be made in the specific embodiment of the invention described herein, such modifications being within the spirit and scope of the invention claimed, it is indicated that all matter contained herein is intended as an illustrative and not as limiting in scope.

Having thus described the invention, what I claim as new and desire to secure by Letters Patent of the United States is:

1. A portable battery operated cold-hot food storage unit having an interior chamber capable of holding food articles contained therein in a fixed vertical position, which comprises:
   a. an outer rectangularly shaped housing having a base, a pair of upwardly extending sidewalls, an upwardly extending rearwall, and an open front face;
   b. an inner rectangularly shaped metallic shell contained within said housing, said shell having a base, a pair of upwardly extending sidewalls, an upwardly extending rearwall, and an open front face;
   c. an insulation layer sandwiched between said outer housing and said inner shell;
   d. a door hingably mounted onto said housing, said door having an outer layer, an inner layer, and an insulation layer sandwiched between said inner layer;
   e. a horizontal partition affixed onto said walls of said inner shell dividing said interior chamber into an upper and a lower portion;
   f. a cooling assembly consisting of a fluid tank, a compressor, an electric motor, an expansion valve, and a condensor contained in said lower portion of said interior chamber;
   g. a removable plate covering said open front face of said lower portion of said interior chamber;
   h. means for powering said electric motor;
   i. a first section of said upper portion of said interior chamber having a first thermostat and cooling coil elements therein and communicating with said cooling assembly;
   j. a second section of said upper portion of said interior chamber having a second thermostat and heating coil elements, said heating coils extending downwardly into said lower portion of said interior chamber;
   k. means for heating said heating coil elements;
   l. a plurality of horizontal shelves contained in said upper portion;
   m. a plurality of vertical shelves contained in said upper chamber, said vertical shelves aligned side to side or front to back;
   n. means for adjustably affixing said horizontal shelves to said sidewalls of said inner casing, said means comprising a plurality of mounting brackets, each said bracket consisting of an elongated U-shaped flange having a magnetic circular disc affixed onto one end of said U-shaped flange each said magnetic circular disc engaging said sidewalls of said inner shell;
   o. a pair of retractable metallic pin members mounted each end of each said horizontal and vertical shelve, said pin members extending linearly outwardly from each said shelve, said pin members of each said horizontal shelve resting into one said U-shaped flange;
   p. means for adjustably affixing said vertical shelves between said horizontal shelves, said means comprising each said horizontal shelve having a plurality of longitudinal aligned rows of apertures therethrough, said pin members on each end of each said vertical shelve inserting into said apertures of two said horizontal shelves; and
   q. means for adjustably affixing said vertical shelves between one said horizontal shelf and said upper end of said inner shell or one said horizontal shelf and said bottom base of said inner shell, said means comprising a plurality of mounting members, each said mounting member consisting of an elongated cylindrically shaped sleeve having a magnetic base member affixed onto one end of each said sleeve, said magnetic base member engaging with said upper end of said inner shell and said pin members inserting into each said sleeve of each said mounting member, as well as said aperture of said horizontal shelf.

2. A storage unit according to claim 1, wherein each said horizontal and said vertical shelf further comprises a rectangularly shaped panel consisting of outer layers of thermoplastic having an insulation layer sandwiched between said outer layers.

3. A storage unit as recited in claim 1, wherein said means for powering said electric motor comprises:
   a. a first two way switch having two terminals, said first switch wired to said electric motor;
   b. a first step down transformer wired to one said terminal of said two way switch, said first transformer adapted to receive a household current supply; and
   c. a first storage battery wired to the other said terminal of said two way switch.

4. A storage unit as recited in claim 1, wherein said means for heating said heating coil element further comprises:
   a. a heating element thermally communicating with said heating coil element;
   b. a second two way switch wired to waid heating element, said second switch having two terminals;
   c. a second storage battery wired to one said terminal of said second switch;
   d. a second transformer wired to the other said terminal of said second switch, said transformer adapted to receive said household current supply.

* * * * *